(12) United States Patent
Villeneuve

(10) Patent No.: US 7,239,788 B2
(45) Date of Patent: Jul. 3, 2007

(54) APPARATUS AND METHOD FOR INSPECTING OPTICAL FIBER END FACE

(75) Inventor: Nicolas Villeneuve, Charlesbourg (CA)

(73) Assignee: 4198638 Canada Inc., St-Laurent, Quebec (CA)

(*) Notice: Subject to any disclaimer, the term of this patent is extended or adjusted under 35 U.S.C. 154(b) by 30 days.

(21) Appl. No.: 10/445,315

(22) Filed: May 27, 2003

(65) Prior Publication Data

US 2004/0213537 A1    Oct. 28, 2004

Related U.S. Application Data

(60) Provisional application No. 60/382,562, filed on May 24, 2002.

(51) Int. Cl.
*G02B 6/00* (2006.01)
(52) U.S. Cl. .................. 385/134; 385/147
(58) Field of Classification Search .............. 385/53, 385/134, 147, 136, 137; 359/385, 391, 393
See application file for complete search history.

(56) References Cited

U.S. PATENT DOCUMENTS

| 5,309,329 | A | * | 5/1994 | Thiel et al. ............... 362/17 |
| 5,459,564 | A | | 10/1995 | Chivers |
| 5,724,127 | A | * | 3/1998 | Csipkes et al. ........... 356/73.1 |
| 6,178,285 | B1 | * | 1/2001 | Csipkes et al. ........... 385/147 |
| 6,412,987 | B1 | * | 7/2002 | Horwitz et al. ........... 385/56 |
| 6,700,690 | B1 | * | 3/2004 | Buchsbaum et al. ........ 359/230 |
| 2004/0125366 | A1 | * | 7/2004 | Kitani et al. ............. 356/237.1 |

* cited by examiner

*Primary Examiner*—Sarah Song
(74) *Attorney, Agent, or Firm*—Ogilvy Renault LLP

(57) ABSTRACT

An adapter for use in the process of inspecting the end face of an optical fiber. The adapter is used as an interface between an inspection probe and a connector. The connector holds an the optical fiber end which has a surface. The adaptor comprises a positioning mechanism having an attachment portion for releasable attachment to the connector; and a fixture adapted for releasable attachment to the probe. The fixture is mounted to the positioning mechanism and is moveable relative to the attachment portion. The positioning mechanism permits movement of the probe for inspection of the surface.

28 Claims, 2 Drawing Sheets

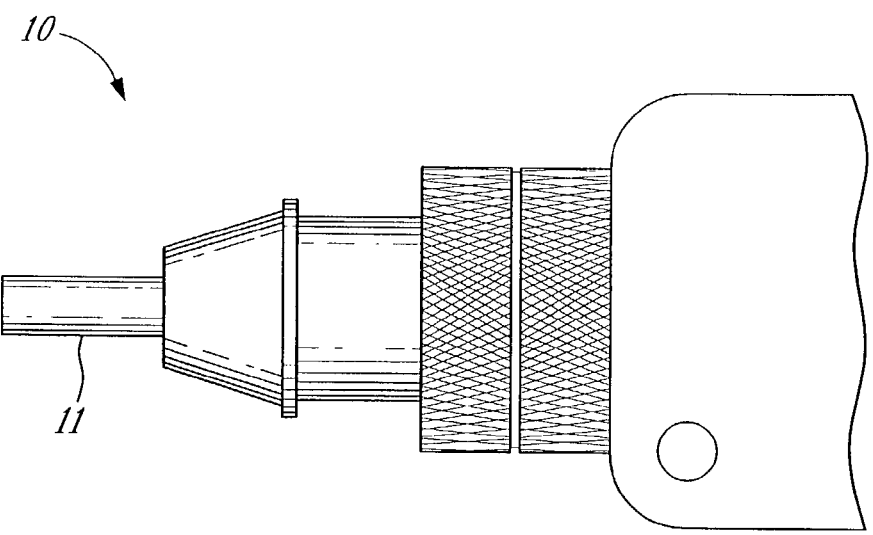
FIG_1
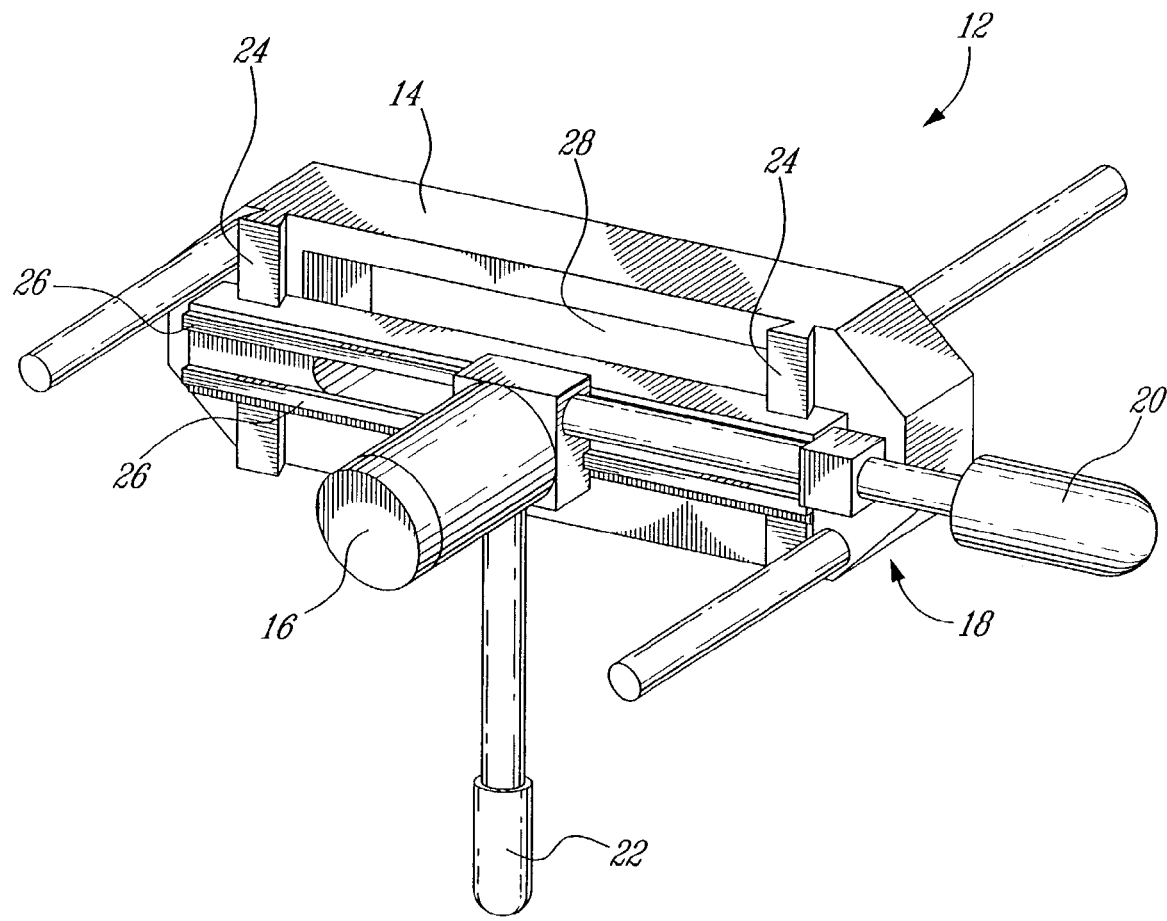
FIG_2

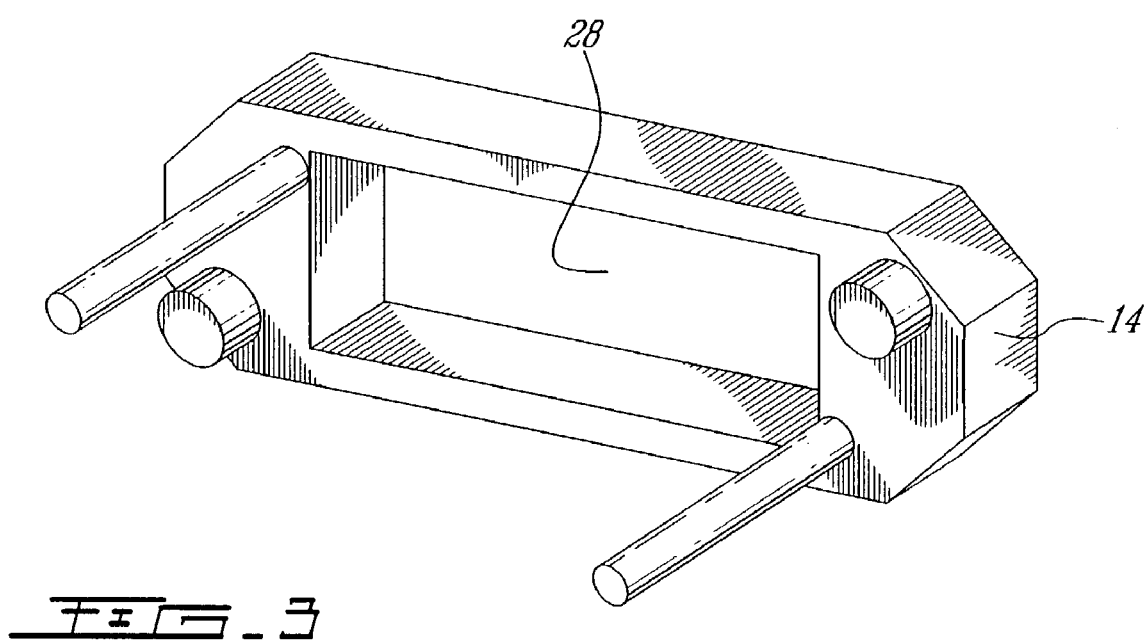
FIG_3

APPARATUS AND METHOD FOR INSPECTING OPTICAL FIBER END FACE

CROSS-REFERENCE TO RELATED APPLICATIONS

This application claims the benefit of priority under 35 U.S.C § 119 from U.S. Patent Application No. 60/382,562 filed on May 24, 2002, the disclosure of which is incorporated by reference as if set forth in full in this document.

FIELD OF THE INVENTION

This invention relates to the field of optical fiber inspection. More particularly, it relates to an apparatus and method for performing the inspection of optical fibers that may be mounted in a connector.

BACKGROUND OF THE INVENTION

Using optical fiber as a transport medium for telecommunication demands special attention. The fiber must be in impeccable condition and exemplary cleanliness is preferable to limit errors that could appear at the receiver. Distance and physical pressure on the fiber can modify signal quality. It is really important to minimize controllable factors that can seriously affect quality of signal and even cause total loss of continuity.

Oil, dust and scratches can degrade the quality of signal. To correctly inspect fibers in a optical fiber connector, an optical fiber microscope (probe 10 of FIG. 1) must be used. Many companies are specialized in this technology and it is applicable for many types of connectors (SC, ST, MTP . . . ). The better known microscopes are made by Westover and Telonix.

Some connectors require specific attention in view of the high density of their smaller MTP connectors. The guide pins of some connectors pose another problem: focus can't be achieved because the focal distance of a conventional fiberscope is too short. Their lenses are too big and make contact with the MTP guide pins. Optical fibers are therefore not inspected correctly. Another restriction is that the female connector is also very complex. It contains the same number of MTP connectors but they have to be inspected without unplugging them from the connector body (not shown).

U.S. Pat. No. 5,459,564, issued Oct. 17, 1995 describes an apparatus and method for inspecting end faces of optical fibers and optical fiber connectors. However, the apparatus and method described therein comprises many parts, is difficult to use and to manufacture, is bulky and not easily transportable.

A practical tool for verifying the quality of each and every fiber is not presently available. Therefore, there is a need in the industry for an improved optical fiber end inspection apparatus.

SUMMARY OF THE INVENTION

The tool described herein allows for safe (e.g., no danger of laser radiation into a user's eyes) and easy inspection (e.g., on a PC screen) of every fiber in an Optical Interconnect Module (OIM) (not shown) or similar apparatus without having to remove any of them from the connector (not shown), or mounting assembly (not shown), of the OIM A particular objective of the adapter 12 (shown in FIG. 2) is to permit safe and easy visual inspection the end face or surface (not shown) of every fiber comprised in an optical fiber connector. Inspecting and ensuring that the end face of fibers are clean and free of defects is a mandatory precaution for good connectivity.

In accordance with an embodiment, the invention provides An adapter for use in the process of inspecting the end face of an optical fiber. The adapter is used as an interface between an inspection probe and a connector. The connector holds an the optical fiber end which has a surface. The adaptor comprises a positioning mechanism having an attachment portion for releasable attachment to the connector; and a fixture adapted for releasable attachment to the probe. The fixture is mounted to the positioning mechanism and is moveable relative to the attachment portion. The positioning mechanism permits movement of the probe for inspection of the surface.

DESCRIPTION OF THE DRAWINGS

FIG. 1 is a partial side view showing an optical fiber inspection probe;

FIG. 2 is a partial rear perspective view showing an adapter in accordance with an embodiment of the invention; and FIG. 3 is a partial front perspective view showing the adapter of FIG. 2.

DESCRIPTION OF EXEMPLARY EMBODIMENTS

This inspection procedure demands the use of a optical fiber inspection probe 10 (as shown in FIG. 1). In an exemplary embodiment, a digital camera from WestOver is used. This camera includes a lens 11 smaller than on conventional equipment (around ⅛ inch of diameter) and an expansion factor of 200×. With this type of camera, it will be possible to inspect every fiber of each connector without being obstructed by the connector guide pins. The camera will be used for female or male connector inspection. MTP connector guide pins are placed at a length of 2 mm but this camera requires a focal distance of 8.9 mm.

In an exemplary embodiment, an adapter 12 is used as an interface between a probe 10 and a connector (not shown). The connector holds an optical fiber end (not shown) which has a surface (the end surface or end face). The adaptor 12 comprises a positioning mechanism 18 having an attachment portion 14 for releasable attachment to said connector. The adaptor 12 also comprises a fixture 16 adapted for releasable attachment to the probe 10. Fixture 16 is moveable relative to the attachment portion 14.

In the exemplary embodiment shown in FIG. 2, positioning mechanism 18 includes vertical sliding rails 24 for vertically positioning probe 10, which is attached to fixture 16. Positioning mechanism 18 may also include horizontal sliding rails 26 for horizontally positioning probe 10. In this embodiment, fixture 16 is tube shaped to receive probe end 11. Probe end 11 may thereby extend through inspection window 28 made within the attachment portion 14. In an embodiment of the invention, movement of the fixture is controlled by adjustment of horizontal and vertical micrometric screws (20 and 22 respectively).

The user may therefore control the positioning mechanism 18 to move probe 10 for inspection of the entire optical fiber end surface.

In an exemplary embodiment, the camera (probe 10) will be installed on a fixture 16 that is moveable in the X and Y directions in order to completely cover the surface of all the fibers in a connector. The camera 10 will be attached on the fixture 16 and will move relative to the connector to carry out inspection of all fibers. In another embodiment, the fixture 16 could be placed on a workstation (not shown).

In yet another embodiment, a Universal Serial Bus (USB) adapter (not shown) connects directly on the camera 10 allowing visualization of the quality and cleanliness of the connector on a computer monitor (not shown). In this case, the adaptor 12 will be very useful for field representatives (users) who need to work directly at the customer's site. This USB adapter may come with a software (FiberChek™) that can automatically inspect the quality of the fibers. In a mouse click, the software may perform a fiber inspection and determine if it passes or fails according to predetermined parameters. This increases speed as well as quality assurance for each cable.

For inspection of the connectors located inside an OIM, the procedure will almost be the same. It is also important to note that to visually inspect cables with standard equipment a user has to disassemble the OIM. To prevent this, another type of fixture is required in order to inspect the connector without disconnecting the adjacent cable.

Two exemplary embodiments of the method and apparatus for inspecting the connectors are presented herein. The first is manual and the other is the automated. Both methods and apparatuses are applicable to many types of connectors (e.g., male or female).

In the manual embodiment, the inspection procedure requires that the operator moves the camera with micrometric screws: one for the X direction (20) and another for the Y (22). This manual operation will be valid for the inspection of the cable (like the OIM connectors). Then, the operator will verify the entire surface of the connector, fiber after fiber by carrying out the test inspection with the FiberChek™ software. The results can then be sent through camera 10 USB port to a user interface such as a computer screen. The results can be compiled in a file and be analyzed in a report later.

The automated embodiment is a more sophisticated alternative that eliminates manual handling. In fact, the micrometric screws (20 and 22) can be replaced by electric stepper motors controlled by a micro controller (not shown) connected on the parallel port of a computer (not shown). A software program, that will be part of the user interface, will allow inspection of every fiber on each connector without worrying about the position of the camera 10.

The program will carry out the automatic positioning of the camera 10 and will call the inspection software. If the fibre is clean, the camera will move to the next fibre. If it is not clean, it will notify the operator to clean affected fibers/connectors. Complete inspections can be recorded in a file and results compiled later on.

In another embodiment, the invention comprises an apparatus for inspecting end surfaces of an optical fiber assembly (not shown). The assembly is mounted within a connector body. The apparatus comprises a base (not shown) on which is mounted adapter 12. The inspection apparatus also comprises an imaging device comprising said probe 10 for obtaining a focused image of said optical fiber end surfaces.

In another embodiment, the invention comprises a method for inspecting an optical fiber end having a surface. The optical fiber end is mounted within a connector. The method comprises releasably attaching positioning mechanism 18 having an attachment portion 14 to the connector; releasably attaching probe 10 to fixture 16; and selecting a position of fixture 16 for inspection of the optical fiber end surface.

The invention claimed is:

1. An adapter between a probe and a connector, said connector for holding an optical fiber end having a surface, said adaptor comprising:
 a) a positioning mechanism having an attachment portion for releasable attachment to said connector; and
 b) a fixture adapted for releasable attachment to said probe, said fixture being mounted to said positioning mechanism and moveable relative to said attachment portion;
said positioning mechanism for permitting movement of said probe for inspection of said surface
wherein said surface is substantially parallel to an end surface plane, said probe for obtaining an image of said surface, and wherein said positioning mechanism permits movement of said probe substantially in parallel to the end surface plane;
wherein said positioning mechanism further comprises horizontal and vertical sliding rails on which said fixture is slidably mounted thereby resulting in said fixture being slidably mounted to said positioning mechanism.

2. The adapter of claim 1 wherein said fixture comprises a hollow coupling portion, and wherein said probe is mounted within said hollow coupling portion.

3. The adapter of claim 1 wherein said positioning mechanism further permits movement of said probe substantially perpendicularly to the end surface plane.

4. The adapter of claim 3 wherein said fixture is slidably mounted to said positioning mechanism.

5. The adapter of claim 1 wherein said positioning mechanism further comprises an adjustment means for selecting a horizontal and a vertical position of said fixture on said sliding rails.

6. The adapter of claim 5 wherein said adjustment means comprises a micrometric screw.

7. The adapter of claim 5 wherein said adjustment means comprises an electric stepper motor.

8. An apparatus for inspecting end surfaces of an optical fiber assembly, said assembly being mounted within a connector body, comprising:
 a) a base;
 b) the adapter of claim 1 mounted to said base; and
 c) an imaging device comprising said probe for obtaining a focused image of said optical fiber end surfaces.

9. The apparatus of claim 8, wherein said attachment portion comprises an opening for extension of said probe.

10. The apparatus of claim 9 wherein said surface is substantially parallel to an end surface plane, said probe for obtaining an image of said surface, and wherein said positioning mechanism permits movement of said probe substantially in parallel to the end surface plane.

11. The apparatus of claim 10 wherein said fixture comprises a hollow coupling portion, and wherein said probe is mounted within said hollow coupling portion.

12. The apparatus of claim 10 wherein said positioning mechanism further permits movement of said probe substantially perpendicularly to the end surface plane.

13. The apparatus of claim 12 wherein said fixture is slidably mounted to said positioning mechanism.

14. The apparatus of claim 13 wherein said positioning mechanism further comprises horizontal and vertical sliding rails on which said fixture is slidably mounted.

15. The apparatus of claim 14 wherein said positioning mechanism further comprises an adjustment means for selecting a horizontal and a vertical position of said fixture on said sliding rails.

16. The apparatus of claim 15 wherein said adjustment means comprises a micrometric screw.

17. The apparatus of claim 15 wherein said adjustment means comprises an electric stepper motor.

18. The apparatus of claim 14, wherein said horizontal and vertical sliding rails are for permitting movement of said fixture substantially in parallel to said end surface plane.

19. The apparatus of claim 14, wherein said horizontal and vertical sliding rails are for permitting movement of said fixture in two dimensions that are substantially parallel to said end surface plane.

20. The apparatus of claim 14, wherein said perpendicular movement is in the z-axis, said vertical sliding rails for permitting movement in the y-axis and said horizontal sliding rails for permitting movement in the x-axis.

21. The apparatus of claim 8, wherein said positioning mechanism is for permitting movement of said probe for inspection of said surface while said positioning mechanism is attached to said connector.

22. The apparatus of claim 8, wherein said positioning mechanism is for permitting movement of said probe in three dimensions for inspection of said surface.

23. The adapter of claim 1, said positioning mechanism is for permitting movement of said probe for inspection of said surface while said positioning mechanism is attached to said connector.

24. The adapter of claim 1, wherein said horizontal and vertical sliding rails are for permitting movement of said fixture substantially in parallel to said end surface plane.

25. The adapter of claim 1, wherein said horizontal and vertical sliding rails are for permitting movement of said fixture in two dimensions that are substantially parallel to said end surface plane.

26. The adapter of claim 1, wherein said perpendicular movement is in the z-axis, said vertical sliding rails for permitting movement in the y-axis and said horizontal sliding rails for permitting movement in the x-axis.

27. The adapter of claim 1, wherein said positioning mechanism is for permitting movement of said probe in three dimensions for inspection of said surface.

28. The adapter of claim 1, wherein said connector comprises an optical interface module holding optical fiber ends each having a surface and said positioning mechanism for permitting movement of said probe for inspection of each said optical fiber end surfaces.

* * * * *